(12) United States Patent
Shibao

(10) Patent No.: US 12,340,130 B2
(45) Date of Patent: Jun. 24, 2025

(54) DATA PROCESSING DEVICE, IMAGE PROCESSING DEVICE DISPLAYS SETTING SCREEN FOR FUNCTION CORRESPONDING TO JOB INFORMATION RECEIVED FROM REMOTE TERMINAL, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Mayumi Shibao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/936,771

(22) Filed: Sep. 29, 2022

(65) Prior Publication Data
US 2023/0098824 A1 Mar. 30, 2023

(30) Foreign Application Priority Data
Sep. 30, 2021 (JP) ................. 2021-160997

(51) Int. Cl.
G06F 3/12 (2006.01)
B41M 3/14 (2006.01)
H04N 1/00 (2006.01)

(52) U.S. Cl.
CPC .......... *G06F 3/1238* (2013.01); *G06F 3/1204* (2013.01); *G06F 3/1222* (2013.01); *G06F 3/1257* (2013.01); *B41M 3/14* (2013.01); *G06F 3/1292* (2013.01); *H04N 1/00408* (2013.01)

(58) Field of Classification Search
None
See application file for complete search history.

(56) References Cited

U.S. PATENT DOCUMENTS

| | | | | |
|---|---|---|---|---|
| 11,503,185 | B2 * | 11/2022 | Hosoda | H04N 1/4433 |
| 2008/0291489 | A1 * | 11/2008 | Takahashi | H04N 1/00413 |
| | | | | 358/1.15 |
| 2015/0186087 | A1 * | 7/2015 | Miyazawa | H04N 1/00442 |
| | | | | 358/1.15 |
| 2015/0242167 | A1 | 8/2015 | Yamaguchi | |
| 2016/0182762 | A1 * | 6/2016 | Eum | H04N 1/00307 |
| | | | | 358/1.14 |
| 2016/0371040 | A1 * | 12/2016 | Idehara | G06F 3/1212 |
| 2017/0155793 | A1 * | 6/2017 | Masumoto | G06F 3/1288 |
| 2019/0163421 | A1 * | 5/2019 | Tadachi | G06F 21/6245 |
| 2020/0274992 | A1 | 8/2020 | Yamada | |
| 2020/0285437 | A1 * | 9/2020 | Mori | G06F 3/1203 |

FOREIGN PATENT DOCUMENTS

JP 2015161971 A 9/2015
KR 20180096513 A 8/2018

* cited by examiner

*Primary Examiner* — Haris Sabah
(74) *Attorney, Agent, or Firm* — Canon U.S.A., Inc., IP Division

(57) ABSTRACT

An image forming device includes a memory; and at least one processor in communication with the memory. The at least one processor of the image forming device is configured to perform: receiving job information for executing a function of the image forming device from a terminal, the job information including user information; based on the user information included in the received job information, logging a user into the image forming device; executing a job based on the received job information; and based on execution of the job, logging out the user from the image forming device.

31 Claims, 11 Drawing Sheets

DATA PROCESSING DEVICE, IMAGE PROCESSING DEVICE DISPLAYS SETTING SCREEN FOR FUNCTION CORRESPONDING TO JOB INFORMATION RECEIVED FROM REMOTE TERMINAL, CONTROL METHOD THEREFOR, AND NON-TRANSITORY COMPUTER-READABLE STORAGE MEDIUM

BACKGROUND OF THE INVENTION

Field of the Invention

The present invention relates to a data processing system in which a job is executed by wireless communication performed between a data processing device and an image forming device.

Description of the Related Art

In recent years, with the spread of high-performance mobile terminals called smartphones, there has been an increase in the number of terminals that can instruct image forming devices to execute functions such as a scan function, a print function, and an image data sending function. For example, with the image data sending function, a terminal searches for an image forming device on a network, adds the e-mail address of a user-set destination and various types of scan setting information (such as color and double-sided) to image data, and configures it as a job. The terminal sends the configured job to the image forming device found by the search, and the image forming device executes a function based on the received job.

In doing so, a series of settings and execution instructions necessary for sending image data may be performed with the terminal. At this time, network communication between the terminal and the image forming device is established according to a communication protocol such as the Transmission Control Protocol/Internet Protocol (TCP/IP), near-field communication (NFC), or Bluetooth (registered trademark), and can be realized using technology of the related art.

Japanese Patent Laid-Open Publication No. 2015-161971 discloses technology in which a terminal sends a job to an image forming device, and, after the image forming device executes the job, in the case where the image forming device accepts no user operation for a certain period of time while a logout process is not executed, and an operation is performed on the terminal, the image forming device automatically performs a logout process.

However, in the method of Japanese Patent Laid-Open Publication No. 2015-161971, because the image forming device does not perform a logout process unless a certain period of time has elapsed after the execution of a job is completed, there has been a security issue that other users can operate the image forming device in the meantime.

The present invention provides a method that ensures security even in the case where a terminal sends a job to an image forming device, and the image forming device to which a user is currently logged in executes the job.

SUMMARY OF THE INVENTION

An image forming device includes a memory; and at least one processor in communication with the memory. The at least one processor of the image forming device is configured to perform: receiving job information for executing a function of the image forming device from a terminal, the job information including user information; based on the user information included in the received job information, logging a user into the image forming device; executing a job based on the received job information; and based on execution of the job, logging out the user from the image forming device.

Further features of the present invention will become apparent from the following description of embodiments with reference to the attached drawings.

DESCRIPTION OF THE EMBODIMENTS

Hereinafter, embodiments of the present invention will be described using the drawings.

Note that elements described in the embodiments are only illustrative and are not intended to limit the scope of the present invention only thereto. The following description is given using an image forming device as an example of an information processing device, but this is not the only possible kind of information processing device.

First Embodiment

Figure 1:
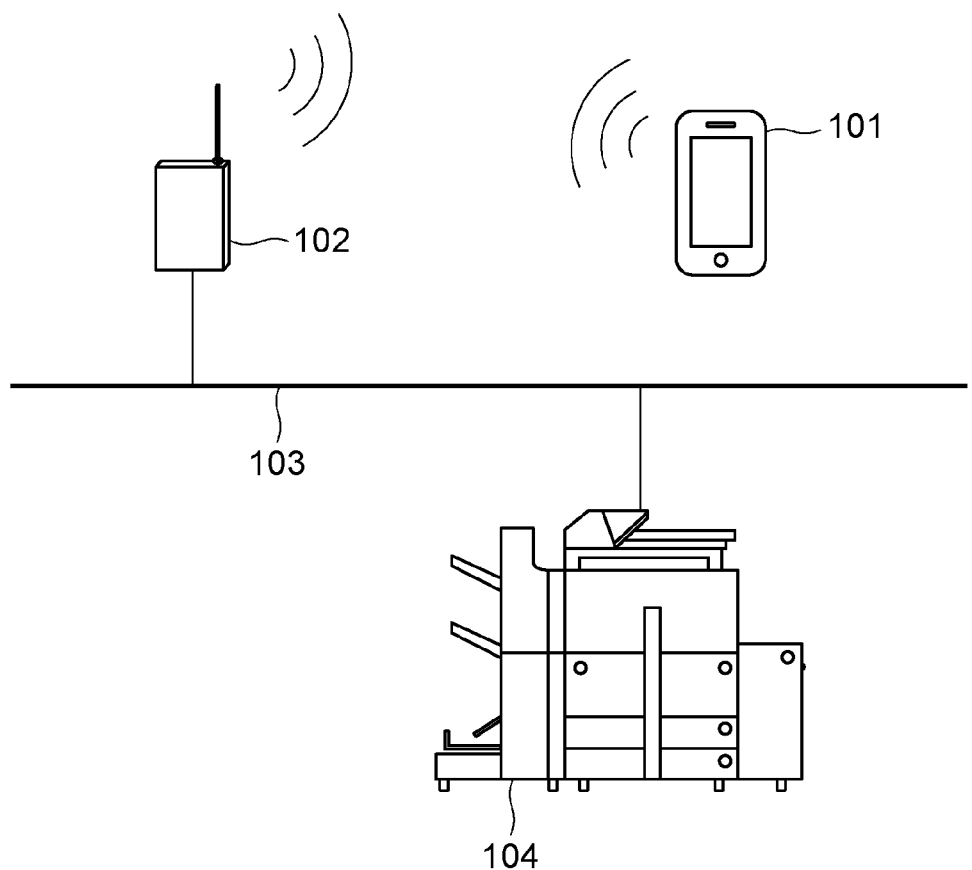
FIG. 1 is a diagram illustrating a data processing system.

FIG. 1 is a diagram illustrating the configuration of a data processing system according to a first embodiment. A data processing system 100 includes a data processing device 101, a wireless local area network (LAN) terminal 102, and an image forming device 104, and these devices are interconnected via a network 103 such as a LAN. Devices other than those indicated herein may be connected to the network 103.

The data processing device 101 is, for example, a mobile terminal such as a smartphone, and may be an information processing device in which an operating system for a small terminal and programs for controlling voice calls, location detection, and data communication run. Alternatively, the data processing device 101 may be a personal computer (PC) not equipped with functions such as voice call control, location detection control, and the like. The data processing device 101 is connected to the network 103 also by the wireless LAN terminal 102.

The wireless LAN terminal 102 is a wireless LAN master unit having a general network router function, and provides a wireless LAN at home, office, etc.

The image forming device 104 is a multifunctional peripheral (MFP) equipped with various functions such as a printer function, a copy function, a scanner function, and a fax sending function. However, the image forming device 104 is not limited to the above, and may be a device that only has a single function. The image forming device 104 may be configured to include a wireless access point internally and may be configured to be able to communicate directly with the data processing device 101. A user can instruct the image forming device 104 to execute a job from the data processing device 101 that is in communication with the image forming device 104, thereby executing various functions of the image forming device 104. Although the image forming device 104 is connected by wire to the network 103 in the present embodiment, like the data processing device 101, the image forming device 104 may be connected wirelessly using the wireless LAN terminal 102.

Furthermore, the data processing device 101 and the image forming device 104 can perform short-range wireless communication using near-field communication (NFC), Bluetooth Low Energy (BLE), or the like. The image forming device 104 sends connection information (IP address, media access control (MAC) address, service set identifier (SSID), etc.) for establishing a wireless LAN connection with the image forming device 104 via an NFC communication unit or a BLE communication unit, which will be described later, to the data processing device 101. Using the obtained connection information, the data processing device 101 starts wireless LAN communication with the image forming device 104.

Figure 2:
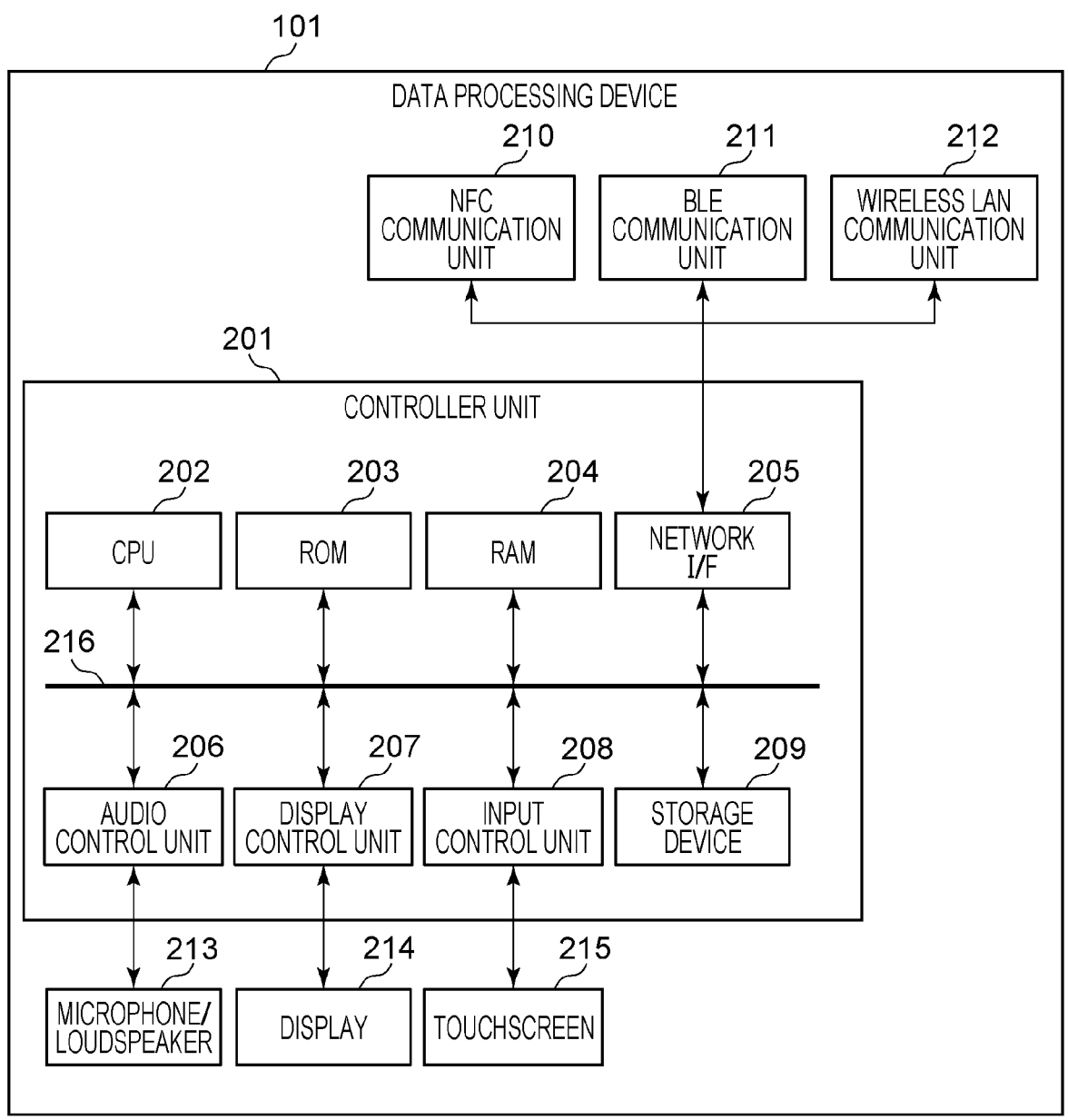
FIG. 2 is a block diagram illustrating the hardware configuration of a data processing device.

FIG. 2 is a hardware configuration diagram of the data processing device 101 according to the present embodiment. The data processing device 101 includes a controller unit 201. The controller unit 201 controls various communication units such as an NFC communication unit 210, a BLE communication unit 211, and a wireless LAN communication unit 212, and various user interface (UI) units such as a microphone/loudspeaker 213, a display 214, and a touchscreen 215.

The controller unit 201 includes a central processing unit (CPU) 202, a read-only memory (ROM) 203, a random-access memory (RAM) 204, a network interface (I/F) 205, an audio control unit 206, a display control unit 207, an input control unit 208, and a storage device 209, which are connected by a system bus 216.

The CPU 202 controls the entire system of the data processing device 101. The ROM 203 stores the operating system of the data processing device 101 and programs for controlling voice calls, data communication, and the like, and the CPU 202 executes various programs. The RAM 204 is used as a temporary storage area such as the main memory, work area, and the like for the CPU 202.

The storage device 209 is a non-volatile storage device, and records various operation mode settings, operation logs, and the like that need to be maintained even after the data processing device 101 is restarted.

The network I/F 205 is connected to the NFC communication unit 210, the BLE communication unit 211, and the wireless LAN communication unit 212, and exchanges data with the image forming device 104 using various types of wireless communication.

The audio control unit 206 performs input/output control of audio data via the microphone/loudspeaker 213. The display control unit 207 performs output control of a screen displayed on the display 214. The input control unit 208 performs input control of information designated by the user via a button or the touchscreen 215. Various applications executed by the data processing device 101 use the audio control unit 206, the display control unit 207, the input control unit 208, and the like.

Figure 3:
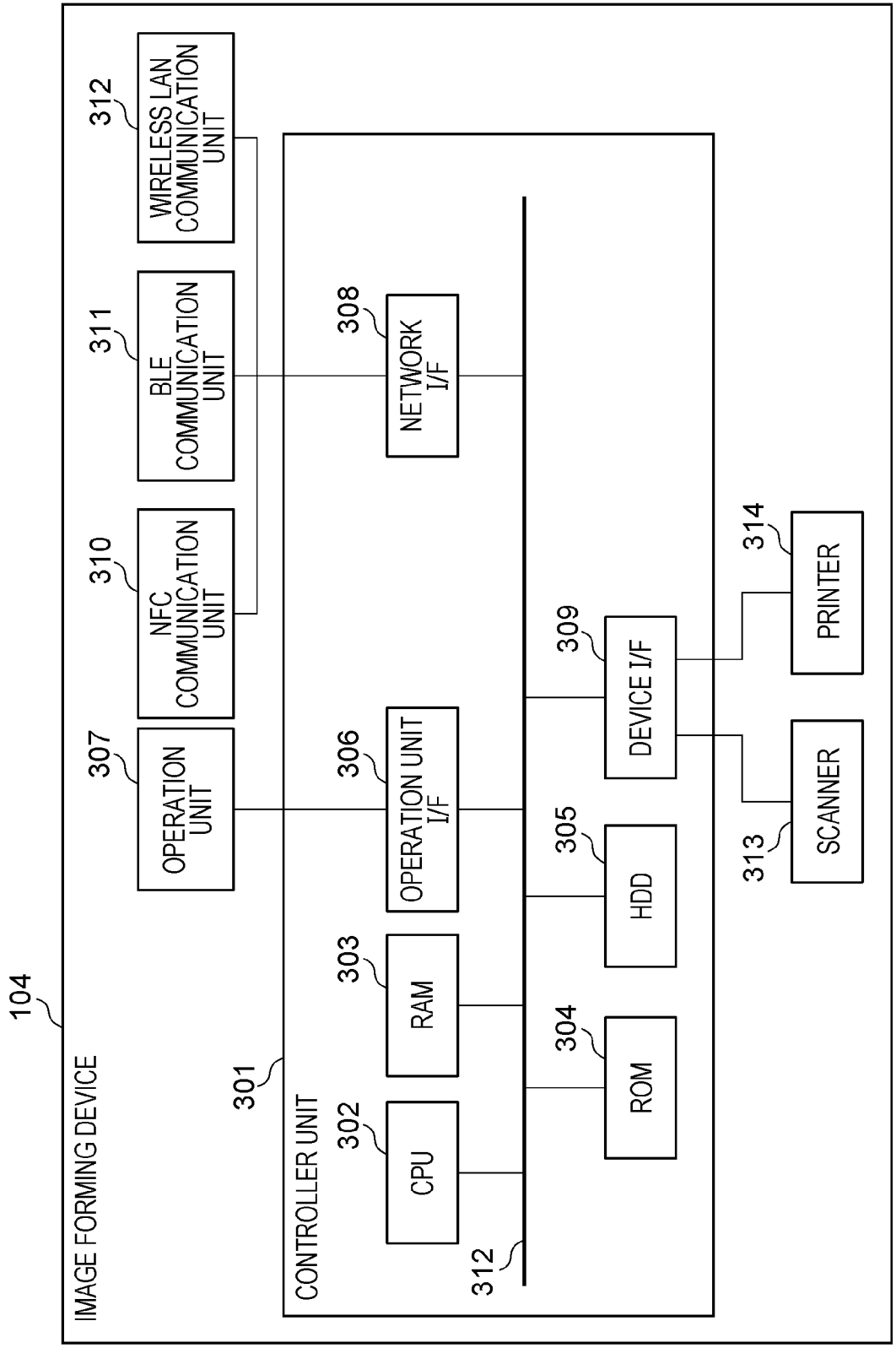
FIG. 3 is a block diagram illustrating the hardware configuration of an image forming device.

FIG. 3 is a hardware configuration diagram of the image forming device 104 according to the present embodiment. The image forming device 104 includes a controller unit 301, and the controller unit 301 controls various communication units such as an NFC communication unit 310, a BLE communication unit 311, and a wireless LAN communication unit 312, an operation unit 307, a scanner 313, and a printer 314. In the case where the user uses the copy function of the image forming device 104, the controller unit 301 controls the scanner 313 to obtain the image data of an original, and controls the printer 314 to print and output an image on paper. In addition, in the case where the user uses the scan and send function, the controller unit 301 controls the scanner 313 to obtain the image data of an original, and convert the image data to code data. Then, the code data is sent to the data processing device 101 or the like via a network I/F 308. Moreover, in the case where the user uses the print function, the controller unit 301 receives image data (code data) from the data processing device 101 via the network I/F 308. The controller unit 301 sends the received image data to the printer 314. On the basis of the received image data, the printer 314 prints and outputs an image on paper. The image forming device 104 also has a fax reception function of receiving data from Integrated Services Digital Network (ISDN) or the like and printing the received data, and a fax sending function of sending scanned data to ISDN or the like. In order to execute each of the functions as mentioned above, a to-be-processed task set by the user is referred to as a job, and the image forming device 104 executes a certain job in accordance with job information.

The controller unit 301 includes a CPU 302, a RAM 303, a ROM 304, a hard disk drive (HDD) 305, an operation unit I/F 306, the network I/F 308, and a device I/F 309, which are connected by a system bus 315.

The CPU 302 controls the entire system of the image forming device 104. The RAM 303 is a system work memory for the CPU 302 to operate, and temporarily stores image data and the like.

The RAM 303 also stores scanned image data read by the scanner 313, and print image data received from the data processing device 101 via the network 103.

The ROM 304 stores a system boot program, applications, and the like. The HDD 305 stores an operating system, system software, application software, image data, setting data, and the like.

The operation unit 307 displays information to the user and accepts operations from the user.

The operation unit 307 includes, for example, an operation panel such as a touchscreen display.

The operation unit I/F 306 outputs information to be displayed on the operation unit 307 to the operation unit 307.

The operation unit I/F 306 also accepts information entered by the user from the operation unit 307. The network I/F 308 is connected to the NFC communication unit 310, the BLE communication unit 311, and the wireless LAN communication unit 312, and exchanges information with the data processing device 101 and a cloud server 105 using various types of communication. The wireless LAN communication unit 312 performs wireless LAN communication with the data processing device 101 via the network 103. In addition, the NFC communication unit 310 and the BLE communication unit 311 perform short-range wireless communication with the data processing device 101. The image forming device 104 receives a job's setting information, image data, a job execution command, and the like from the data processing device 101 via the network I/F 308, and executes the job. The device I/F 309 connects the scanner 313 and the printer 314, which execute reading and printing of image data, and the controller unit 301, and inputs/outputs image data.

Figure 4:
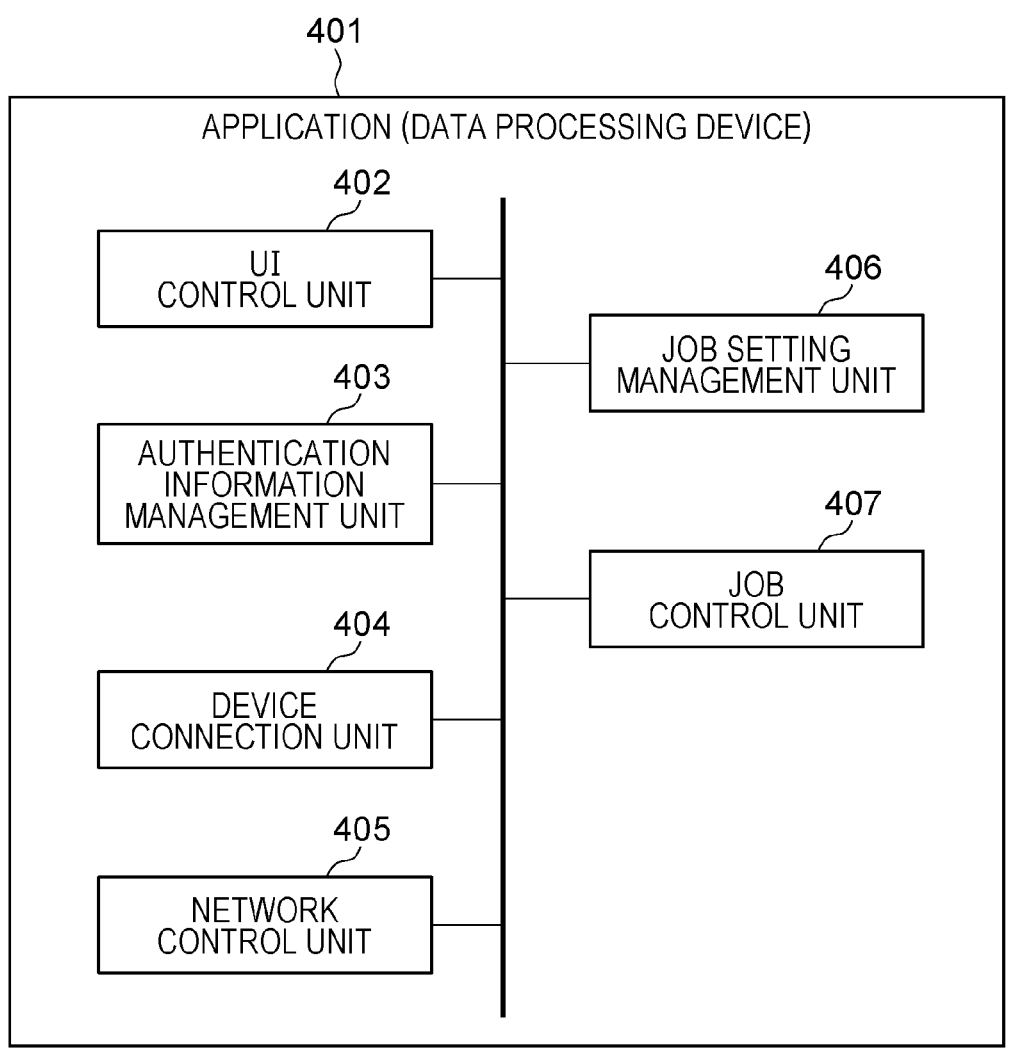
FIG. 4 is a block diagram illustrating the software configuration of the data processing device.

FIG. 4 illustrates the software configuration of the data processing device 101 according to the present embodiment. FIG. 4 is a functional block diagram of software realized when the CPU 202 reads a control program stored in the ROM 203 or the storage device 209.

An application 401 is an application installed in the data processing device 101 and is an application for causing the image forming device 104 to operate. Print job information or scan job information can be generated by configuring settings on the application 401, and the job information can be sent to the image forming device 104. Besides the application 401, various applications are installed in the data processing device 101, but the description thereof is omitted. The configuration of the application 401 will be discussed below.

A UI control unit 402 accepts job setting information and the like entered by the user on the touchscreen 215, and sends the received contents to a job setting management unit 406 and a job control unit 407 via the input control unit 208. In addition, the UI control unit 402 receives responses from the job setting management unit 406 and the job control unit 407, and outputs a screen in accordance with the received contents to the display 214 via the display control unit 207. Furthermore, the UI control unit 402 accepts authentication information for logging into the image forming device 104, such as user information and a password entered by the user on the touchscreen 215, and sends the authentication information to an authentication information management unit 403 via the input control unit 208.

The authentication information management unit 403 registers the authentication information such as the user information and the like received from the UI control unit 402. On the basis of the registered authentication information, the authentication information management unit 403 performs a process of logging into the image forming device 104. Specifically, the authentication information is passed to a network control unit 405. The authentication information is sent to the image forming device 104 via the network 103. Using the received authentication information, the image forming device 104 performs a login process and returns the result to the data processing device 101. The registered authentication information can also be given when sending job information.

A device connection unit 404 establishes short-range wireless communication using, for example, NFC or BLE, and/or wireless LAN communication via the network 103 between the data processing device 101 and the image forming device 104. For example, in the case of NFC, short-range wireless communication is started when the user brings the NFC communication unit 210 of the data processing device 101 and the NFC communication unit 310 of the image forming device 104 closer to each other. In the case of BLE, the BLE communication unit 311 of the image forming device 104 sends a BLE beacon, and the BLE communication unit 211 of the data processing device 101 receives the sent beacon. In response to a determination that the radio wave intensity of the beacon received by the data processing device 101 has become a certain level or greater when the user brings the data processing device 101 closer to the image forming device 104, short-range wireless communication is started. As described above, when the user brings the NFC or BLE communication units of the data processing device 101 and the image forming device 104 closer to each other, the device connection unit 404 performs short-range wireless communication with the image forming device 104. Then, the device connection unit 404 obtains, via the short-range wireless communication, device information including connection information necessary for wireless LAN communication from the image forming device 104. Using the obtained connection information, the device connection unit 404 starts wireless LAN communication with the image forming device 104 via the network 103.

The network control unit 405 sends job information (such as setting information, a job execution instruction command, image data, and user authentication information) to the image forming device 104 via the network 103. In the case of configuring job information for sending scanned image data to a set destination, the job setting information includes a destination to which the data is to be sent, settings related to a scan, and the like. Furthermore, the network control unit 405 can also receive job setting information and the like stored in the image forming device 104 via the network 103.

The job setting management unit 406 stores job setting information which has been entered by the user and accepted by the UI control unit 402, and/or job setting information received from the image forming device 104 by the network control unit 405 in the RAM 204 or the storage device 209. At this time, the job setting management unit 406 may register these items of job setting information as "favorites" that are settings that the user often uses. In addition, the job setting management unit 406 may register certain job setting information as "presets" at the time the application 401 is installed.

The job control unit 407 controls a process executed by the image forming device 104. For example, the job control unit 407 generates job information from job setting information included in the "favorites" or "presets" registered in the job setting management unit 406 or job setting information set by a user operation, and sends a job execution instruction for the image forming device 104 via the network 103. Moreover, the job control unit 407 obtains a job execution status and the device operating state of the scanner 313 and the printer 314 from the image forming device 104 via the network 103, and sends the obtained information to the UI control unit 402.

Figure 5:
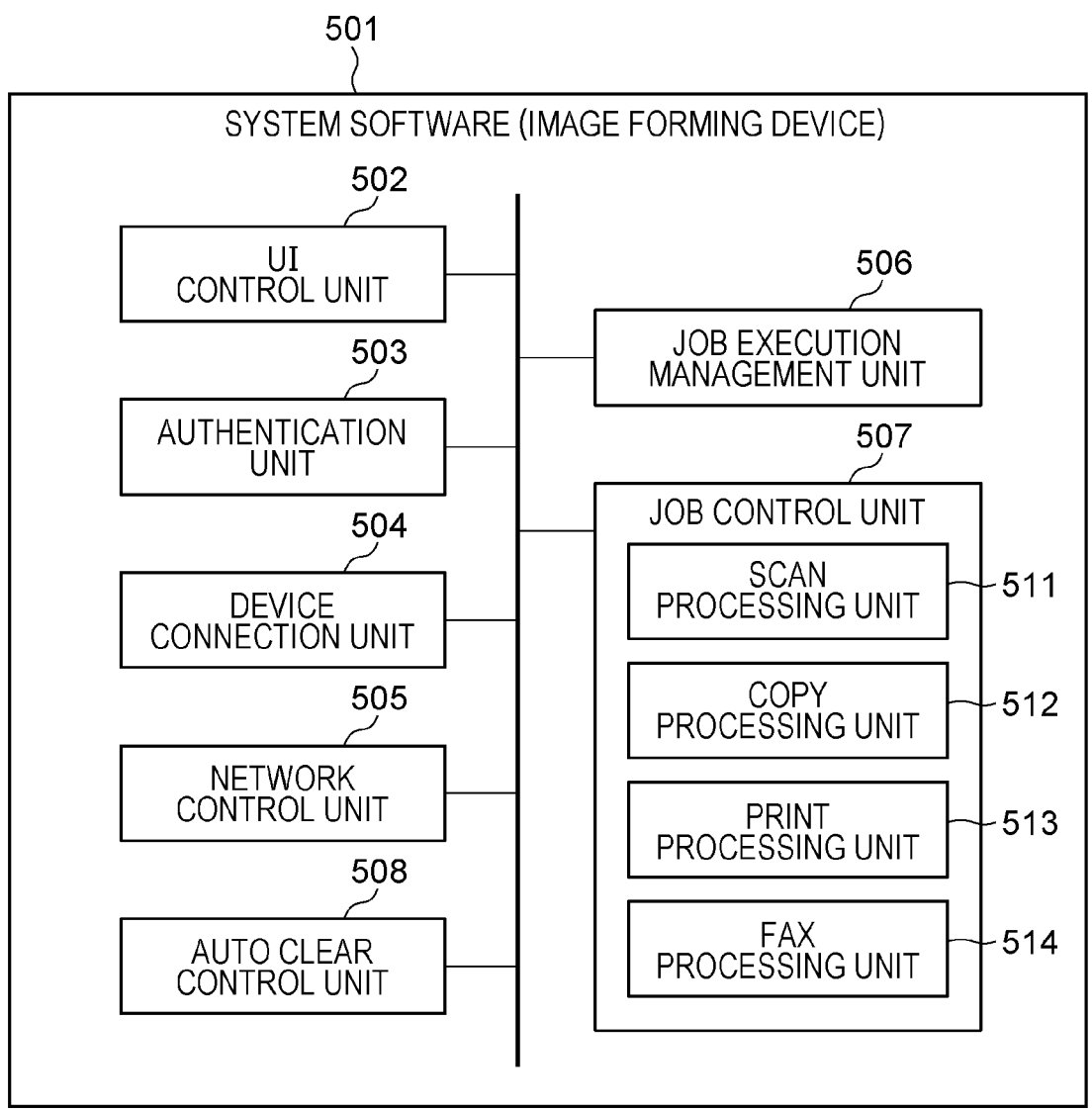
FIG. 5 is a block diagram illustrating the software configuration of the image forming device.

FIG. 5 illustrates the software configuration of the image forming device 104 according to the present embodiment. FIG. 5 is a functional block diagram of software realized when the CPU 302 reads a control program stored in the ROM 304 or the HDD 305.

System software 501 manages, for example, applications running on the image forming device 104. A UI control unit 502 accepts job setting information and the like entered by the user via the operation unit 307, and passes the accepted information to a job execution management unit 506 and a job control unit 507. In addition, the UI control unit 502 receives responses from the job execution management unit 506 and the job control unit 507, and outputs a screen based on the responses to the operation unit 307.

An authentication unit 503 performs a login process based on authentication information received from the data processing device 101, and returns the result. The image forming device 104 holds various types of information such as an e-mail address corresponding to the logged-in user.

A device connection unit 504 establishes, for example, wireless LAN communication with the data processing device 101. A network control unit 505 receives job setting information, a job execution instruction command, image data, user authentication information, and the like from the data processing device 101 via the network 103. Furthermore, the network control unit 505 sends job setting information stored in the image forming device 104 to the data processing device 101 via the network 103.

The job execution management unit 506 manages the state of a job being executed. In addition, the job execution management unit 506 stores information related to a job, including job setting information entered by the user using the UI control unit 502 or job setting information received from the data processing device 101 by the network control unit 505, in the RAM 303 or the HDD 305. At this time, the job execution management unit 506 may register these items of job setting information as "favorites" that are settings that the user often uses. In addition, the job execution management unit 506 may register certain job setting information as "presets". In addition, a job executed by the image forming device 104 is managed as "history".

The job control unit 507 controls processing units such as a scan processing unit 511, a copy processing unit 512, a print processing unit 513, and a fax processing unit 514 according to the received job information, and executes various jobs. For example, the job control unit 507 executes various jobs using job setting information set by the user using the operation unit 307 or job setting information registered as "favorites" or "presets" by the job execution management unit 506. Furthermore, the job control unit 507 receives a job execution request received from the data processing device 101 or the like via the network 103, and executes various jobs according to the received job setting information and job execution instruction. Moreover, the job control unit 507 sends a job execution status and the device operating state of the scanner 313 and the printer 314 to the data processing device 101 via the network 103.

An auto clear control unit 508 controls an auto clear process. Auto clear is a process of, when the image forming device 104 accepts no operation from the user for a certain period of time, clearing all the set values set on the display screen and/or displaying a preset initial screen. If the user is logged into the image forming device 104 in the occurrence of auto clear, a logout process is performed automatically.

Next, screens displayed on the operation panel of the image forming device 104 will be described using FIGS. 6A, 6B, and 6C.

Figure 6A:
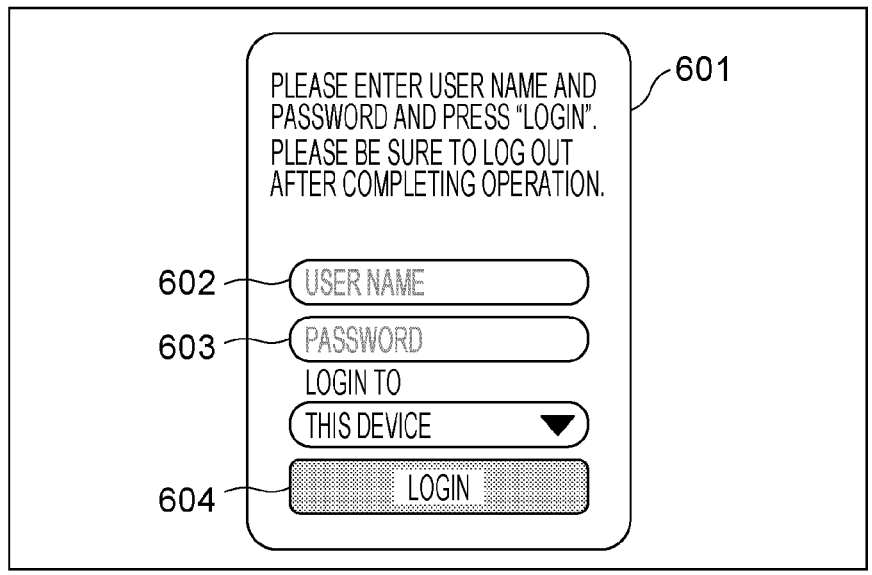
FIGS. 6A, 6B, and 6C illustrate screens displayed by the image forming device.

FIG. 6A is a diagram illustrating an authentication screen of the image forming device 104 according to the present embodiment.

A login screen 601 is a screen for accepting user authentication, and includes a user name entry field 602 for entering the user name of a user logging in locally, and a password entry field 603 for entering a password. Here, a local login is a login for the user to unlock operation on the operation panel of the image forming device 104, and, while the user is logged in locally, other users are not allowed to log in locally or operate the operation panel. When a login button 604 is pressed, the execution of a local login process is started using the user name and the password entered in the fields 602 and 603. Hereinafter, a "login" refers to a local login unless otherwise noted.

Figure 6B:
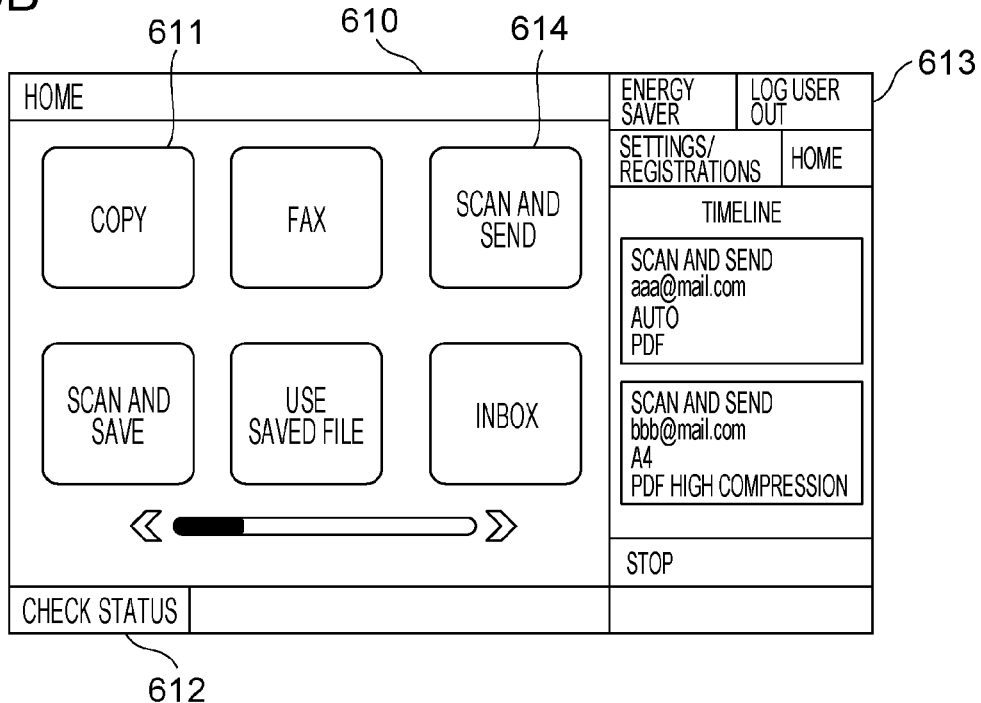

FIG. 6B is a diagram illustrating the home screen of the image forming device 104, which is a screen displayed when, for example, authentication on the login screen 601 is successful, and the user logs into the image forming device 104.

A home screen 610 is a screen that displays a list of functions of the image forming device 104, and is a screen on which the user selects a function that the user wants to use. A copy button 611 is a button for executing the copy function, and, when the copy button 611 is pressed, the home screen 610 transitions to a copy setting screen (not illustrated). When a status checking button 612 is pressed, the home screen 610 transitions to a status checking screen (not illustrated) on which the user can refer to the job execution status and history. At a logout button 613, the user name of a user who is currently logged in locally is displayed, and, when the logout button 613 is pressed, the logged-in user is logged out, and the home screen 610 transitions to the login screen 601. A "scan and send" button 614 is a button for executing the function of sending a scanned image to a set destination. When the "scan and send" button 614 is pressed, the home screen 610 transitions to a "scan and send" setting screen 620.

Figure 6C:
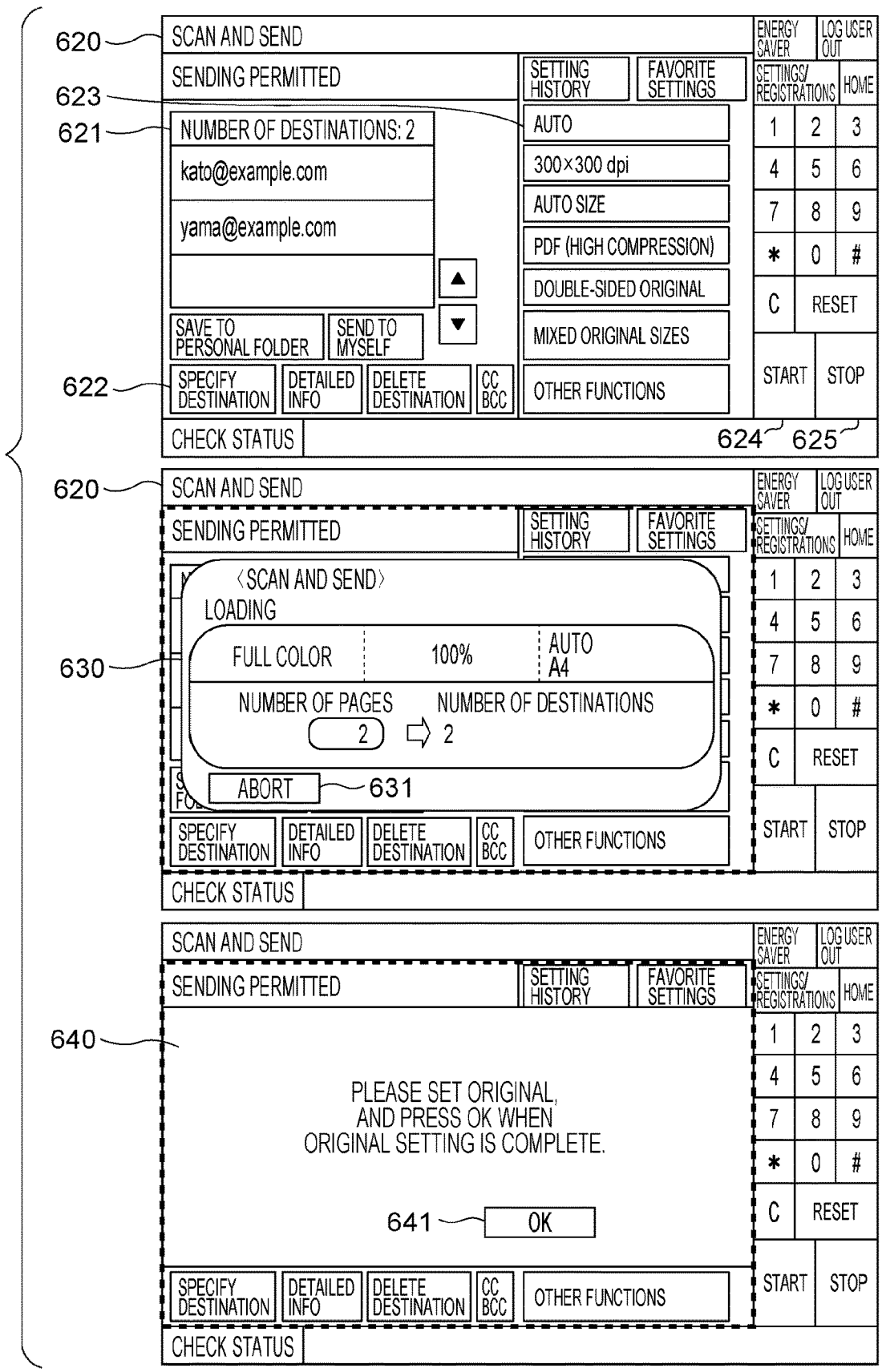

FIG. 6C is a diagram illustrating the screen of the "scan and send" function of the image forming device 104.

The "scan and send" setting screen 620 is a screen for configuring settings of a scan and an image sending destination. In a destination field 621, the set image sending destination is displayed. A destination designation button 622 is a button for setting the image sending destination, and, when the destination designation button 622 is pressed, a list of destinations is displayed. A scan setting area 623 is an area for configuring settings of a scan, and pressing of each button allows each setting to be configured. A start button 624 is a button for executing a process with the contents set on the "scan and send" setting screen 620, and, when the start button 624 is pressed, a scan is executed and an image generated by the scan is sent to the set destination. When the start button 624 is pressed, the image forming device 104 displays a process-in-execution screen 630, which displays the execution status of the process.

When an abort button 631 is pressed while the process-in-execution screen 630 is displayed, the process is stopped and the process-in-execution screen 630 transitions to the home screen 610, or a logout process is performed and the login screen 601 is displayed. When the process is completed, the process-in-execution screen 630 is hidden, and the "scan and send" setting screen 620 is displayed or the process-in-execution screen 630 transitions to the home screen 610. A stop button 625 is a button for interrupting the process in execution.

If no original is placed on the scanner at the time the start button 624 is pressed, an original placement screen 640 is displayed. The user can proceed with the process by placing an original and pressing an OK button 641.

A process of the application 401 performed on the data processing device 101 will be described using FIGS. 7A, 7B, and 7C.

Figure 7A:
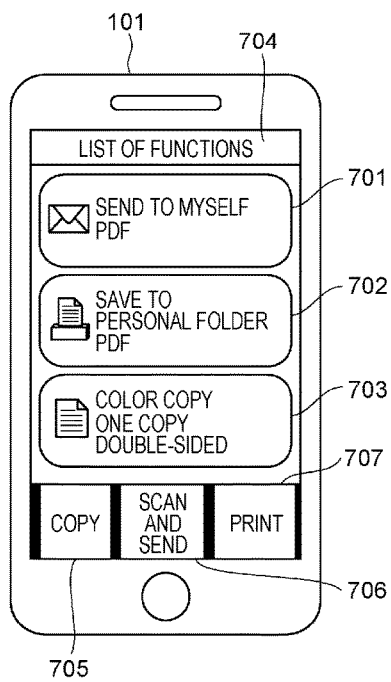
FIGS. 7A, 7B, and 7C illustrate screens displayed by the data processing device.

FIG. 7A is a menu screen of the application 401 running on the data processing device 101. The application 401 is able to communicate with the image forming device 104 and give a process execution instruction to the image forming device 104 according to the contents of settings done on the application 401.

The UI control unit 402 displays a list of processes that use the functions of the image forming device 104 on a menu screen 704 of the application 401. The list displayed here displays, for example, information registered as "favorites" and "presets" mentioned above as buttons. For example, a "send to myself" button 701 for sending an image scanned by the image forming device 104 to the user (the user logged into the image forming device 104) by e-mail, a "save to personal folder" button 702 for saving the scanned image to the user's registered folder, and a "color copy" button 703 for performing double-sided color copying and making one copy are displayed. When the "send to myself" button 701 is pressed, the menu screen 704 transitions to a setting screen (not illustrated) for sending e-mail to the user. When the "save to personal folder" button 702 is pressed, the menu screen 704 transitions to a setting screen (not illustrated) for saving the scanned image data to the user's personal folder. A "copy" button 705 is a button for sending copy job information, and, when the "copy" button 705 is pressed, a setting screen of the copy function is opened with default setting values. A "scan and send" button 706 is a button for scanning and sending job information, and, when the "scan and send" button 706 is pressed, a setting screen of the scan and send function is opened with default setting values. A "print" button 707 is a button for sending print job information, and, when the "print" button 707 is pressed, a setting screen of the print function is opened with default setting values.

Figure 7B:
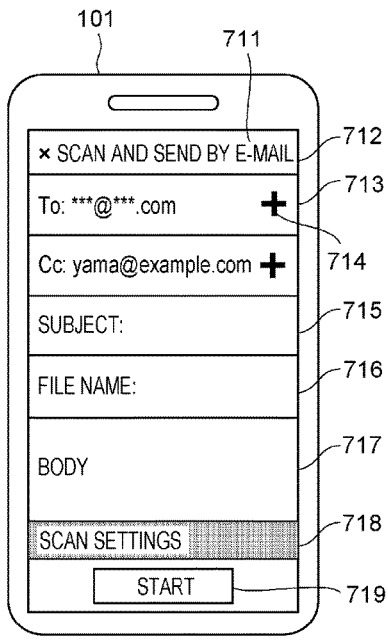

FIG. 7B is a setting screen of the scan and send function, which is a screen displayed when the "scan and send" button 706 is pressed.

A "scan and send" setting screen 711 is a screen for configuring settings for sending a scanned image by e-mail. In a title area 712, a title indicating what the setting screen is for is displayed. A button for cancelling the settings and returning to the menu screen is also arranged. An e-mail address setting area 713 is an area in which the set e-mail address is displayed. By pressing this area, the user may directly enter the e-mail address of the destination using a software keyboard. When an address book start button 714 is pressed, an address book in the data processing device 101 is invoked. When the user selects an e-mail address from the address book invoked, the selected e-mail address is displayed in the e-mail address setting area 713. The user can set multiple e-mail addresses.

The user can enter any character strings in a subject field 715 for entering the subject, a file name entry field 716, and a body field 717 for entering the body using a software keyboard of the data processing device 101. A start button 719 is a button for sending job information to the image forming device 104.

A scan setting button 718 is a button for configuring scan settings, and, when the scan setting button 718 is pressed, the "scan and send" setting screen 711 transitions to a scan setting screen 720. On the scan setting screen 720, a title area 721 displays a title, and a button for confirming the settings and returning to the "scan and send" setting screen 711 is arranged. The scan setting screen 720 includes various buttons related to a scan (such as a color setting button 722), and, by pressing each button, the user is allowed to configure a corresponding setting. For example, when the color setting button 722 is pressed, the "scan and send" setting screen 711 transitions to a color setting screen (not illustrated) on which the color setting is changeable, and the color setting set on the color setting screen is indicated on the button.

Figure 8:
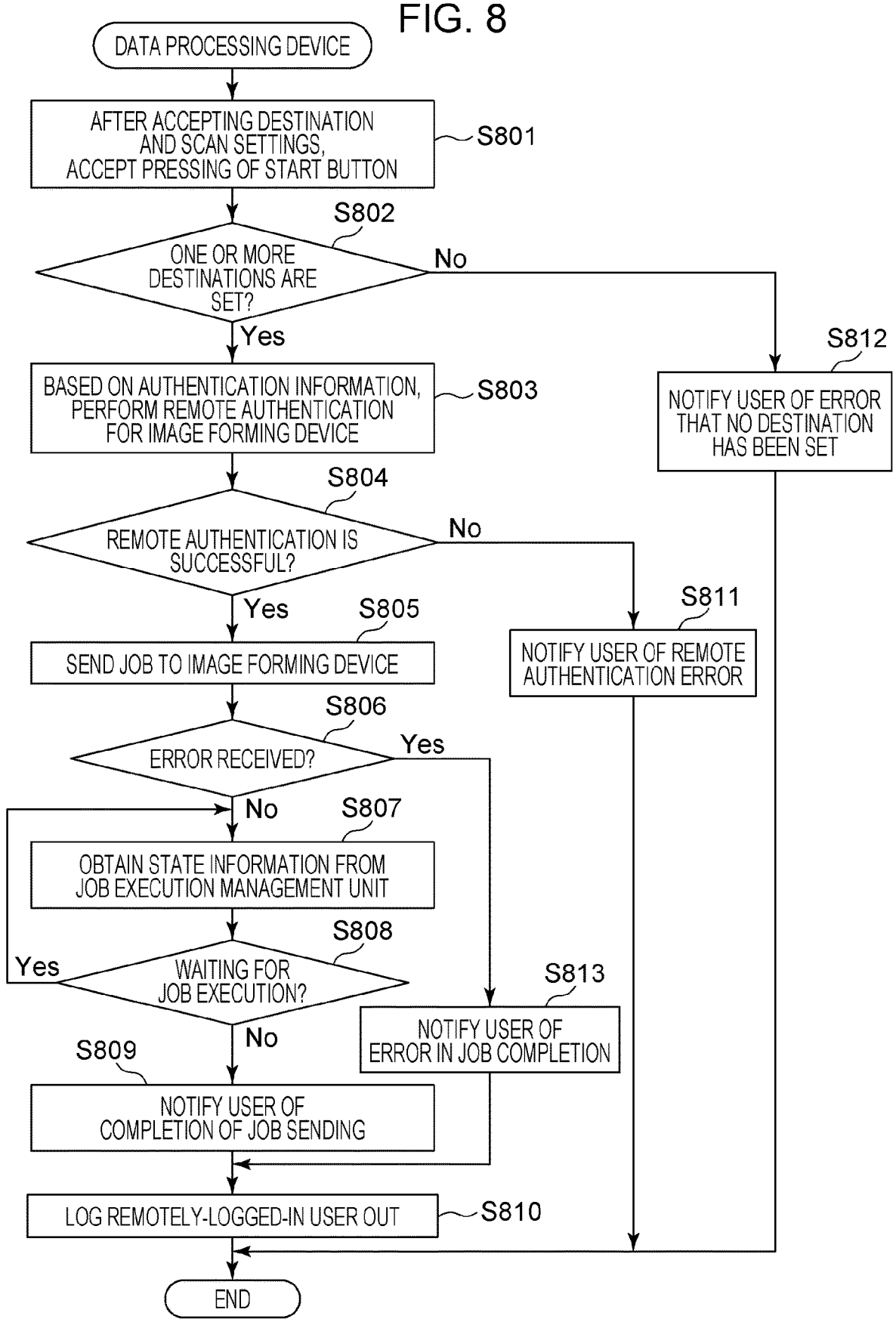
FIG. 8 is a flowchart illustrating a process performed by the data processing device.

Next, a process of sending job information from the data processing device 101 to the image forming device 104 will be described using the flowchart of FIG. 8. Each operation (step) illustrated in the flowchart of FIG. 8 is realized by reading a program for realizing each control module stored in the ROM 203 or the storage device 209 by the CPU 202 into the RAM 204 and executing the program.

Although this flowchart will be described using a case where the user establishes wireless communication between the data processing device 101 and the image forming device 104, selects the "scan and send" button 706 from the menu screen 704 of the data processing device 101, and sends the "scan and send" job information, this flowchart may be the case of sending other jobs, such as fax job or print job information. This flowchart assumes the case in which, before the user logs into the image forming device 104, job information is sent from the data processing device 101 to the image forming device 104.

Figure 7C:
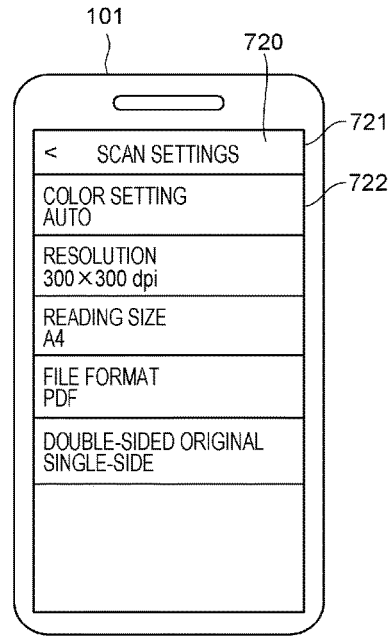

In S801, the UI control unit 402 accepts e-mail and scan settings from the user on the "scan and send" setting screen 711 in FIG. 7B and the scan setting screen 720 in FIG. 7C, and then the UI control unit 402 accepts pressing of the start button 719.

In S802, the job control unit 407 determines whether one or more e-mail addresses, that is, one or more destinations, are set in the accepted e-mail settings. In the case where it is determined that one or more destinations are set in S802, the process proceeds to S803, and if not, the process proceeds to S812, and the UI control unit 402 notifies the user that no destination has been set.

In S803, the job control unit 407 performs remote authentication for communicating with the image forming device 104 using authentication information managed by the authentication information management unit 403. Here, the remote authentication is authenticating whether to allow the exchange of job information between the data processing device 101 and the image forming device 104, and is different from local authentication described later. The authentication information managed by the authentication information management unit 403 is sent to the image forming device 104, and the image forming device 104 performs authentication based on user information registered therein, and returns the result.

In S804, the job control unit 407 determines whether the result of the remote authentication is successful. If the remote authentication is successful, the process proceeds to S805, and if not, the process proceeds to S811, and the UI control unit 402 notifies the user of an error. If the remote authentication is successful, the data processing device 101 remotely logs into the image forming device 104. By remotely logging in, the data processing device 101 becomes able to send job information to the image forming device 104. A remote login here is different from a local login. The case where the remote authentication is not successful is a case where, for example, a setting that prohibits remote access from the data processing device 101 is made in the device setting of the image forming device 104.

In S805, the network control unit 405 configures the authentication information managed by the authentication information management unit 403 and the e-mail and scan settings received on the "scan and send" setting screen 711 and the scan setting screen 720 as a job, and sends the job to the image forming device 104.

In S806, the job control unit 407 determines whether an error has been received from the image forming device 104, and if no error has been received, the process proceeds to S807; otherwise, the process proceeds to S813 and the UI control unit 402 notifies the user of the error. The error here is, for example, a case where local authentication in the image forming device 104, based on user information included in the job information, has failed.

In S807, the job control unit 407 obtains state information of the image forming device 104 from the job execution management unit 506. In S808, the job control unit 407 determines whether the image forming device 104 is waiting for job execution from the obtained state information. The process proceeds to S809 if the image forming device 104 is not waiting, and proceeds to S807 if the image forming device 104 is waiting. Here, waiting for job execution is a state from when the image forming device 104 receives a job to when a process actually starts.

In S809, the UI control unit 402 notifies the user of the completion of sending of job information.

In S810, the network control unit 405 gives a logout request for the remote login to the image forming device 104. At this time, the communication established between the data processing device 101 and the image forming device 104 may be disconnected, or the communication may be maintained in order to obtain a job execution status or the like from the image forming device 104.

With the above process, job information can be sent from the data processing device 101 to the image forming device 104, thereby allowing the image forming device 104 to execute a job. In addition, since the job information sent from the data processing device 101 includes user information, the user can automatically log into the image forming device 104. For jobs that require the user to place an original in front of the image forming device 104, such as the "scan and send" function, it is desirable for the user to unlock the operation panel of the image forming device 104 by performing a local login.

Although an example of logging out from a remote login at the time the data processing device 101 has completely sent a job to the image forming device 104 has been discussed in the above flowchart, this is not the only possible example, and a logout from a remote login may be performed in response to completion of execution of a job on the image forming device 104.

Figure 9:
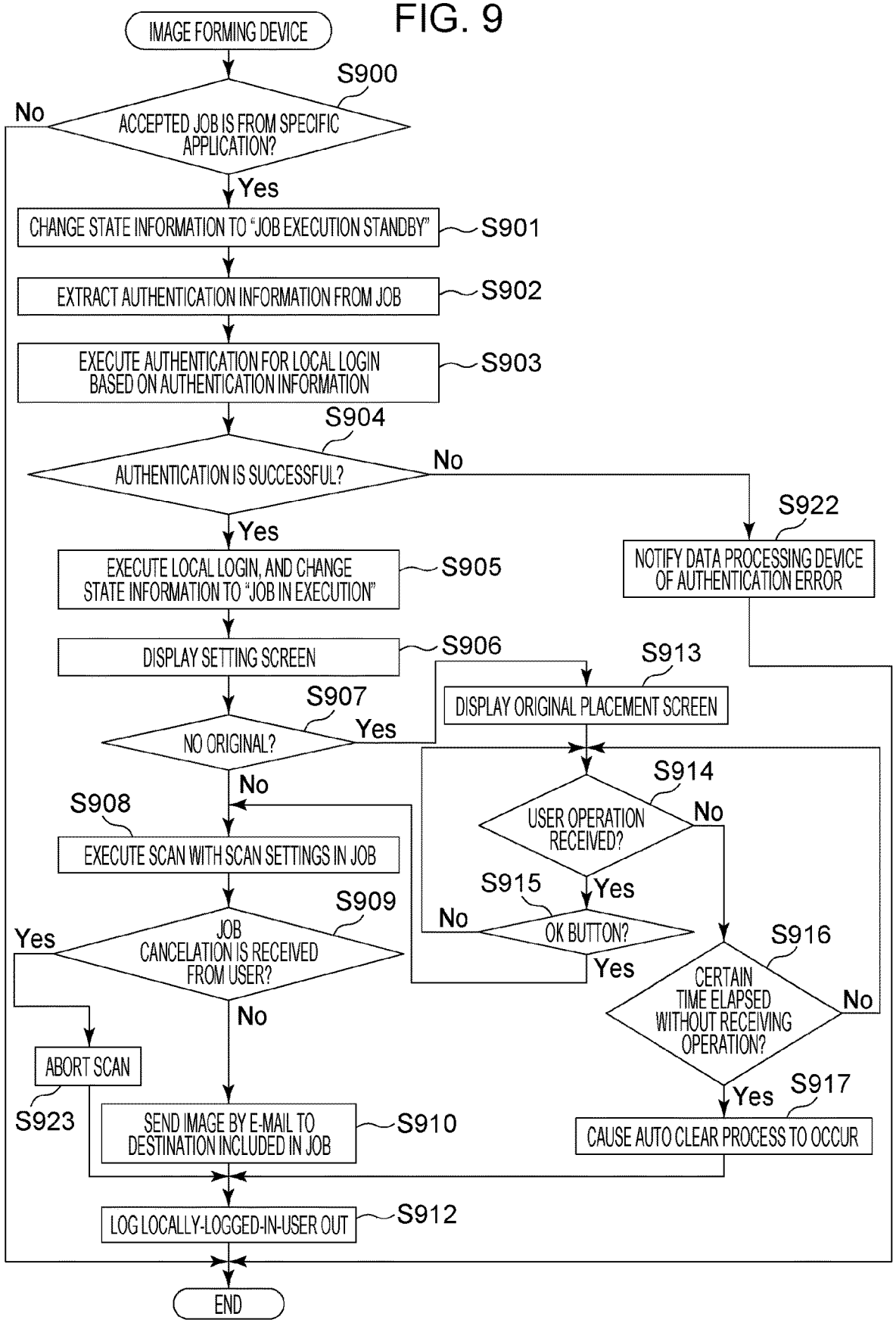
FIG. 9 is a flowchart illustrating a process performed by the image forming device.

Next, a process after the image forming device 104 receives job information from the data processing device 101 will be described using the flowchart illustrated in FIG. 9. Each operation (step) illustrated in the flowchart of FIG. 9 is realized by reading a program for realizing each control module stored in the ROM 304 or the HDD 305 by the CPU 302 into the RAM 303 and executing the program.

This flowchart is started when the image forming device 104 receives sent job information, that is, for example, when the image forming device 104 receives job information sent from the data processing device 101 in S805. Although this flowchart will be described using a case where the image forming device 104 receives the "scan and send" job information from the data processing device 101, the image forming device 104 may receive other jobs.

In S900, the job execution management unit 506 determines whether the received job information has been sent from a specific application. If it is determined that the received job information has been received from a specific application, the process proceeds to S902, and if not, the process is terminated. Here, the specific application is the application 401 for causing the image forming device 104 to operate. Although it is determined here whether the job information has been sent from the specific application, this is not the only possible case, and whether the job information has been sent from a specific device may be determined.

In S901, the job execution management unit 506 changes the state information to job execution standby.

In S902, the authentication unit 503 extracts authentication information from the received job information.

Then, the authentication unit 503 performs authentication for a local login based on the authentication information in S903.

In S904, the authentication unit 503 determines whether the authentication for a local login is successful. If the authentication is successful, the process proceeds to S905, and if not, the authentication unit 503 notifies the data processing device 101 of an authentication error in S922.

In S905, the authentication unit 503 executes the user's local login, and the job execution management unit 506 changes the state information to job in execution.

In S906, the UI control unit 502 displays the "scan and send" setting screen 620 on the operation unit 307.

In S907, the job control unit 507 determines whether an original has been placed on the scanner. If an original has been placed, the process proceeds to S908, and if not, the process proceeds to S913. For example, if no original is placed on the auto document feeder (ADF) and the paper size is undetectable on the original platen, it is determined in S907 that no original has been placed.

In S913, the UI control unit 502 displays the original placement screen 640. In S914, the UI control unit 502 determines whether a user operation has been accepted. If a user operation has been accepted, the process proceeds to S915, and if not, the process proceeds to S916.

In S915, the UI control unit 502 determines whether the accepted operation is pressing of the OK button 641. If the accepted operation is pressing of the OK button 641, the process proceeds to S908, and if not, the process returns to S914.

In S916, the auto clear control unit 508 determines whether a certain period of time has elapsed without receiving an operation from the user. If the certain period of time has not elapsed, the process proceeds to S914; if the certain period of time has elapsed, the process proceeds to S917, and the auto clear control unit 508 causes an auto clear process to occur.

At this time, the data processing device 101 may be notified of the cancellation of the job. Here, since the user is currently logged into the image forming device 104, a logout process of the local login is performed in S912.

In S908, the job control unit 507 executes a scan with the scan settings included in the received job information. At this time, the UI control unit 502 displays the process-in-execution screen 630.

In S909, the job control unit 507 determines whether the cancellation of the job has been received in response to pressing of the abort button 631 or the stop button 625 while the scan is being executed. If the cancellation of the job has not been received, the process proceeds to S910; if the cancellation has been received, the process proceeds to S911, and the job control unit 507 aborts the scan. At this time, the data processing device 101 may be notified that the scan has been aborted.

In S910, the job control unit 507 sends image data generated by the scan to a destination included in the job information by e-mail.

In S912, the authentication unit 503 logs out the user who is locally logged in. Here, since the user of the data processing device 101 to which the job information has been sent is currently logged in locally, this user is logged out. The UI control unit 502 displays the login screen 601.

In this flowchart, when an e-mail message is sent in S910, a logout process is performed in S912. In other words, a logout process is performed after sending an e-mail message. Therefore, when an error such as the data sending capacity exceeded occurs at the time of sending an e-mail message, the data processing device 101 is notified thereof, and the image forming device 104 does not perform a logout process. However, this is not the only possible case. After sending an e-mail message in S910, the process waits until it becomes possible to determine whether e-mail sending is completed without an error, and, if e-mail sending is completed without an error, a logout process may be performed in S912.

Alternatively, not only after sending an e-mail message in S910, but a logout process may also be performed in the case where a certain condition is satisfied. For example, a logout process may be performed when a job has been successfully submitted; a logout process may be performed when the scan is executed in S908; or a logout process may be performed when the execution of the scan is completed.

If an error occurs during the execution of the scan in S908, the image forming device 104 performs no logout process. In doing so, since no logout process is performed in the occurrence of a job execution error, the user can resolve the error on the operation panel of the image forming device 104.

It is also possible to display a sending confirmation screen after sending an e-mail message in S910, depending on the settings of the image forming device 104. In this case, a confirmation screen may be displayed after S910, and when the user presses an OK button, the process proceeds to S912; and when the OK button is not pressed and when a certain period of time has elapsed, an auto clear process may be caused to occur, like S917.

Furthermore, prior to performing a logout process in S912, it may be determined whether the current login state is a login executed in response to reception of the job information. If the login is based on reception of the job information, a logout process may be performed in S912, and if not, a logout process may not be performed.

With the process of this flowchart, even in the case where job information is sent from the data processing device 101 to the image forming device 104 and the user logs into the image forming device locally, the image forming device 104 may be prevented from being operated by other users because the user is automatically logged out after execution of a job. In particular, in the case of executing a job sent from a certain application, a login process and a logout process can be performed automatically. In other words, if the user operates the operation panel of the image forming device 104 to execute a job, the user will not be logged out based on the execution of the job.

Furthermore, the above process dispenses the user from the need to perform an operation for logging out, which improves the operability. As illustrated in the above flowcharts, in the case where the user is automatically logged in based on user information included in job information even if the user does not perform an operation for logging into the image forming device 104, there is a possibility that the user will not realize that a logout operation is necessary. Therefore, security can be ensured by automatically logging out the user.

Second Embodiment

In the first embodiment, the case where the image forming device 104 receives job information from the data processing device 101 while the user is not logged into the image forming device 104 has been discussed. In a second embodiment, the case where the image forming device 104 receives job information from the data processing device 101 while the user is logged into the image forming device 104 will be described. In the case where, after the user operates the operation panel of the image forming device 104 to log into the image forming device 104, the user operates the data processing device 101 to send job information from the data processing device 101 to the image forming device 104, if the image forming device 104 automatically performs a logout process after executing a job, as in the first embodiment, the user is unable to continuously execute a job or perform settings using the operation panel of the image forming device 104. Therefore, in the present embodiment, an example where, when the image forming device 104 receives job information, logout is not performed after execution of a job if the same user as the user who sent the job information is logged in will be described. In addition, after the user operates the operation panel of the image forming device 104 to log into the image forming device 104, while a function setting screen for executing a certain function is open, if the data processing device 101 sends job information of another function to the image forming device 104 and executes the job, a process unintended by the user may be performed. Therefore, in the present embodiment, an example where, if the home screen 610 is displayed at the time the image forming device 104 receives job information, the job is executed, and, if a screen other than the home screen 610 (such as a function setting screen) is displayed, the job is not executed will be discussed. Since the basic configuration of the present embodiment is the same as that of the first embodiment, only the differences will be discussed.

Figure 10:
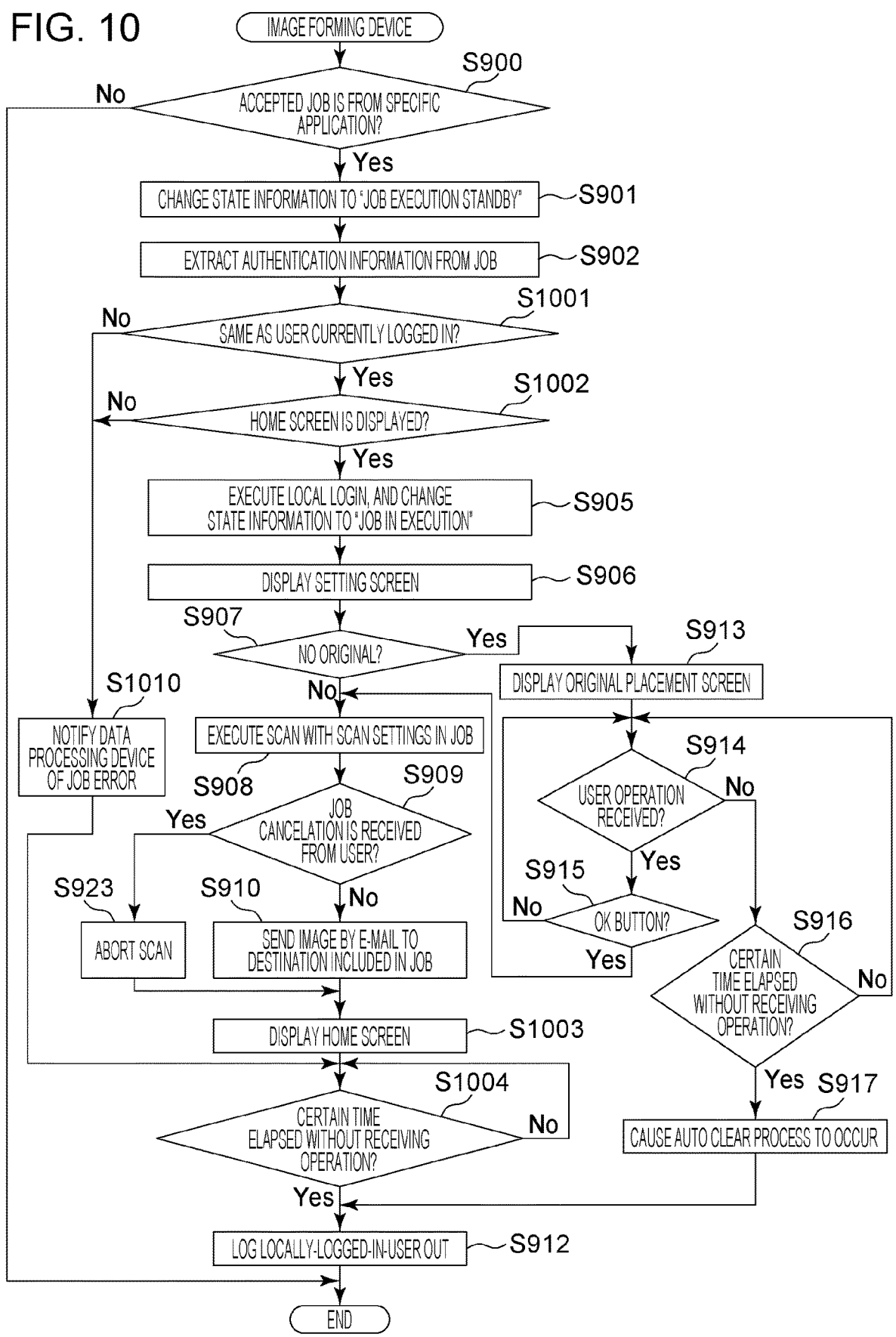
FIG. 10 is a flowchart illustrating a process performed by the image forming device in a second embodiment.

FIG. 10 is a flowchart illustrating a process after the image forming device 104 according to the present embodiment receives job information from the data processing device 101. Each operation (step) illustrated in the flowchart of FIG. 10 is realized by reading a program for realizing each control module stored in the ROM 304 or the HDD 305 by the CPU 302 into the RAM 303 and executing the program. Since the basic configuration of this flowchart is the same as the flowchart of FIG. 9, only the differences will be discussed.

In S1001, the job control unit 507 determines whether user information included in the received job information and user information of a user currently logged into the image forming device 104 match, and if they match, the process proceeds to S1002; otherwise, the process proceeds to S1010 and notifies the data processing device 101 of an error.

In S1002, the UI control unit 502 determines whether the home screen 610 is displayed on the operation unit 307. If the home screen 610 is displayed, the process proceeds to S905, and if not, the process proceeds to S1010 and notifies the data processing device 101 of an error. Although whether the home screen 610 is displayed is determined here by way of example, the home screen 610 is not the only possible screen. For example, whether a screen for checking the job execution status may be displayed may be determined.

After sending an e-mail message in S910, the UI control unit 502 displays the home screen 610 in S1003. In other words, even if the received job is executed, a logout process is not performed.

In S1004, the auto clear control unit 508 determines whether a certain period of time has elapsed without receiving an operation from the user. If the certain period of time has elapsed, the process proceeds to S912 and performs a logout process, and if the certain period of time has not elapsed, S1004 is repeated.

As described above, according to the present embodiment, when the image forming device 104 receives job execution from the data processing device 101 while the user is locally logged into the image forming device 104, the user is not logged out after completing the job execution. In doing so, a user who wants to continue operating the image forming device 104 may be allowed to continuously perform operations on the operation panel. Although the example of not logging out the user based on job execution has been discussed above, it may be configured to allow a logout process to be executed on the basis of job execution.

Third Embodiment

In the first embodiment, the example where the image forming device 104 receives job information from the data processing device 101, and the user is automatically logged out in response to execution of the job information has been discussed. However, after the user sends a job from the data processing device 101 to the image forming device 104, it is troublesome for the user to be logged out even though the user is operating the operation panel of the image forming device 104. Therefore, in a third embodiment, an example in which, if the user is operating the operation panel of the image forming device 104 after sending job information from the data processing device 101 to the image forming device 104, the user is not logged out after the job is executed will be described. Since the basic configuration of the present embodiment is the same as that of the first embodiment, only the differences will be discussed.

In the present embodiment, after the step of S910 in the flowchart of FIG. 9, the UI control unit 502 determines whether the screen transitions from one to another in response to a screen user operation. When the screen transitions from one to another, the process is terminated without going through a logout process in S912, and if the screen does not transition from one to another, the process proceeds to S912 and a logout process is performed. Here, the determination of whether the screen transitions from one to another is determining whether a screen different from the "scan and send" setting screen 620 or the process-in-execution screen 630 is displayed. Although whether the screen transitions from one to another is determined here, this is not the only possible case, and, after the image forming device 104 receives job information, whether an operation on the operation panel of the image forming device 104 has been accepted may be determined.

With the above process, after the user sends job information from the data processing device 101 to the image forming device 104, a logout process is not performed when the user is operating the operation panel of the image forming device 104. Accordingly, the user can continuously operate the operation panel of the image forming device 104.

Other Embodiments

Embodiment(s) of the present invention can also be realized by a computer of a system or apparatus that reads out and executes computer executable instructions (e.g., one or more programs), preferably recorded on a storage medium (which may also be referred to more fully as a 'non-transitory computer-readable storage medium'), to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions, preferably from the storage medium, to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-160997, filed Sep. 30, 2021, which is hereby incorporated by reference herein in its entirety.

What is claimed is:

1. An image forming device comprising:
a memory configured to store a program; and
at least one processor in communication with the memory to execute the program to:
receive job information for executing a function of the image forming device from a remote terminal, the job information including authentication information of a user and job setting information;
automatically perform, based on receiving the job information and by using the authentication information included in the received job information, a login process corresponding to the authentication information without accepting a user operation on the image forming device for inputting the authentication information to the image forming device;
automatically display, based on the received job information, a setting screen on which job setting information included in the job information is displayed, without accepting a user operation on the image forming apparatus for displaying the setting screen, in a case where the login process is successful;
automatically execute a job based on the job setting information included in the received job information, without accepting a user operation on the image forming apparatus for executing the job, in a case where the setting screen is automatically displayed; and
automatically perform a logout process for the user corresponding to the authentication information based on execution of the job, without accepting a user operation on the image forming apparatus for performing the logout process.

2. The image forming device according to claim 1, wherein, in the logout process, the user is logged out in a case where a certain condition is satisfied, and the user is not logged out in a case where the certain condition is not satisfied.

3. The image forming device according to claim 1, wherein, in the logout process, the user is logged out in a case where the received job information is job information sent from a certain application, and the user is not logged out in a case where the received job information is not job information sent from the certain application.

4. The image forming device according to claim 1, wherein, in the logout process, the user is logged out in a case where an operation unit of the image forming device accepts an operation from the user after the job information is received in the receiving.

5. The image forming device according to claim 1, wherein, in the logout process, the user is not logged out in occurrence of an execution error of a job based on the received job information.

6. The image forming device according to claim 1, wherein, in the logout process, the user is not logged out in a case where the user is already logged into the image forming device upon receipt of the job information.

7. The image forming device according to claim 1, wherein, in the logout process, the user is logged out from the image forming device upon execution of the job.

8. The image forming device according to claim 1, wherein, in the logout process, the user is logged out from the image forming device upon completion of the job.

9. The image forming device according to claim 1, wherein the at least one processor further performs:
 in a case where an operation unit of the image forming device accepts no operation from the user for a certain period of time, logging out the user who is logged into the image forming device.

10. The image forming device according to claim 1, wherein the login is a local login for unlocking an operation unit of the image forming device.

11. The image forming device according to claim 1, wherein the job is at least one of a job of sending a scanned image, a copy job, a print job, or a fax job.

12. The image forming device according to claim 1, wherein whether the job information is transmitted from a predetermined application is determined, and in a case where it is determined that the job information is transmitted from the predetermined application, the login process is automatically performed.

13. The image forming device according to claim 1, wherein, in a case where the job is canceled with an operation of the user, the logout process is not automatically performed.

14. The image forming device according to claim 1, wherein the at least one processor further executes the program to receive the job information, and in a case where a document is not placed on a scanner of the image forming device, display a screen prompting the user to place the document.

15. The image forming device according to claim 1, wherein at least the one processor further configured to execute the program to,
 perform the login process by using first authentication information input from an operation unit of the image forming device,
 receive the job information from the remote terminal, the job information including second authentication information,
 determine whether the first authentication information and the second authentication information match, in a case where the first authentication information and the second authentication information match, does not automatically perform the logout process based on the execution of the job.

16. The image forming device according to claim 1, wherein
 in a case where the user operates an operation unit of the image forming device after receiving the job information and a display screen changes, the logout process is not automatically executed.

17. The image forming device according to claim 1, wherein
 the login process is automatically executed without receiving the authentication information by the operation at the image forming device after receiving the job information,
 the job is automatically executed based on the received job information without receiving the authentication information by the operation at the image forming device after receiving the job information.

18. The image forming device according to claim 1, wherein the job information includes an instruction to scan a document and an instruction to transmit the document, and the job setting information includes information about an address of image data generated by scanning the document.

19. The image forming device according to claim 1, wherein execution of the job is scanning the document and transmitting the image data to the address.

20. The image forming device according to claim 19, wherein in a case where an instruction to stop scanning the document is received, the scanning is stopped.

21. The image forming device according to claim 1, wherein a document placement screen is displayed in a case where a document is not placed on a scanning unit of the image forming apparatus, and the document is scanned in a case where a user operation is performed on the document placement screen.

22. The image forming device according to claim 21, wherein an auto clear process to display a preset initial screen is performed in a case where a predetermined time elapses after the document placement screen is displayed.

23. The image forming device according to claim 1, wherein the image forming device is notified that the login process is not successful in a case where the login process is not successful.

24. The image forming device according to claim 1, wherein the logout process is not performed in a case where an error occurs during scanning for execution of the job.

25. The image forming device according to claim 1, wherein the logout process is performed in a case where a confirmation screen is displayed and a logout instruction is issued on the confirmation screen after the image data is transmitted, and an auto clear process to display a preset initial screen is performed in a case where a predetermined time elapses after the confirmation screen is displayed.

26. The image forming device according to claim 1, wherein whether the login process is based on reception of the job information is determined, and the logout process is performed in a case where it is determined that the login process is based on reception of the job information, and the logout process is not performed in a case where it is determined that the login process is not based on reception of the job information.

27. The image forming device according to claim 1, wherein the login process is automatically performed in a case where the job information is received, and the job setting information included in the job information is displayed after a home screen is displayed in a case where the login process is successful.

28. The image forming device according to claim 1, wherein a screen indicating that the job is being executed is automatically displayed based on execution of the job.

29. A method for an image forming device and a terminal, the method comprising:
    receiving job information for executing a function of the image forming device from a remote terminal, the job information including authentication information of a user and job setting information;
    automatically performing, based on receiving the job information and by using the authentication information included in the received job information, a login process corresponding to the authentication information without accepting a user operation on the image forming device for inputting the authentication information to the image forming device after receiving the job information;
    automatically displaying, based on the received job information, a setting screen on which job setting information included in the job information is displayed, without accepting a user operation on the image forming apparatus for displaying the setting screen, in a case where the login process is successful;
    automatically executing a job based on receiving the job setting information included in received job information without accepting a user operation on the image forming apparatus for executing the job in a case where the setting screen is automatically displayed; and
    automatically performing a logout process for the user corresponding to the authentication information based on execution of the job without accepting a user operation on the image forming apparatus for performing the logout process.

30. A method for an image forming device, the method comprising:
    receiving job information for executing a function of the image forming device from a remote terminal, the job information including authentication information of a user and job setting information;
    automatically performing, based on receiving the job information and by using the authentication information included in the received job information, a login process corresponding to the authentication information without accepting a user operation on the image forming device for inputting the authentication information at the image forming device;
    automatically displaying, based on the received job information, a setting screen on which job setting information included in the job information is displayed without accepting a user operation on the image forming apparatus for displaying the setting screen when the login process is successful;
    automatically executing a job based on the job setting information included in the received job information without accepting a user operation on the image forming apparatus for executing the job when the setting screen is automatically displayed; and
    automatically performing a logout process for the user corresponding to the authentication information based on execution of the job without accepting a user operation on the image forming apparatus for performing the logout process.

31. A non-transitory computer-readable storage medium storing a computer program comprising instructions which, when executed by an image forming device, cause the image forming device to perform the method according to claim 30.

* * * * *